…

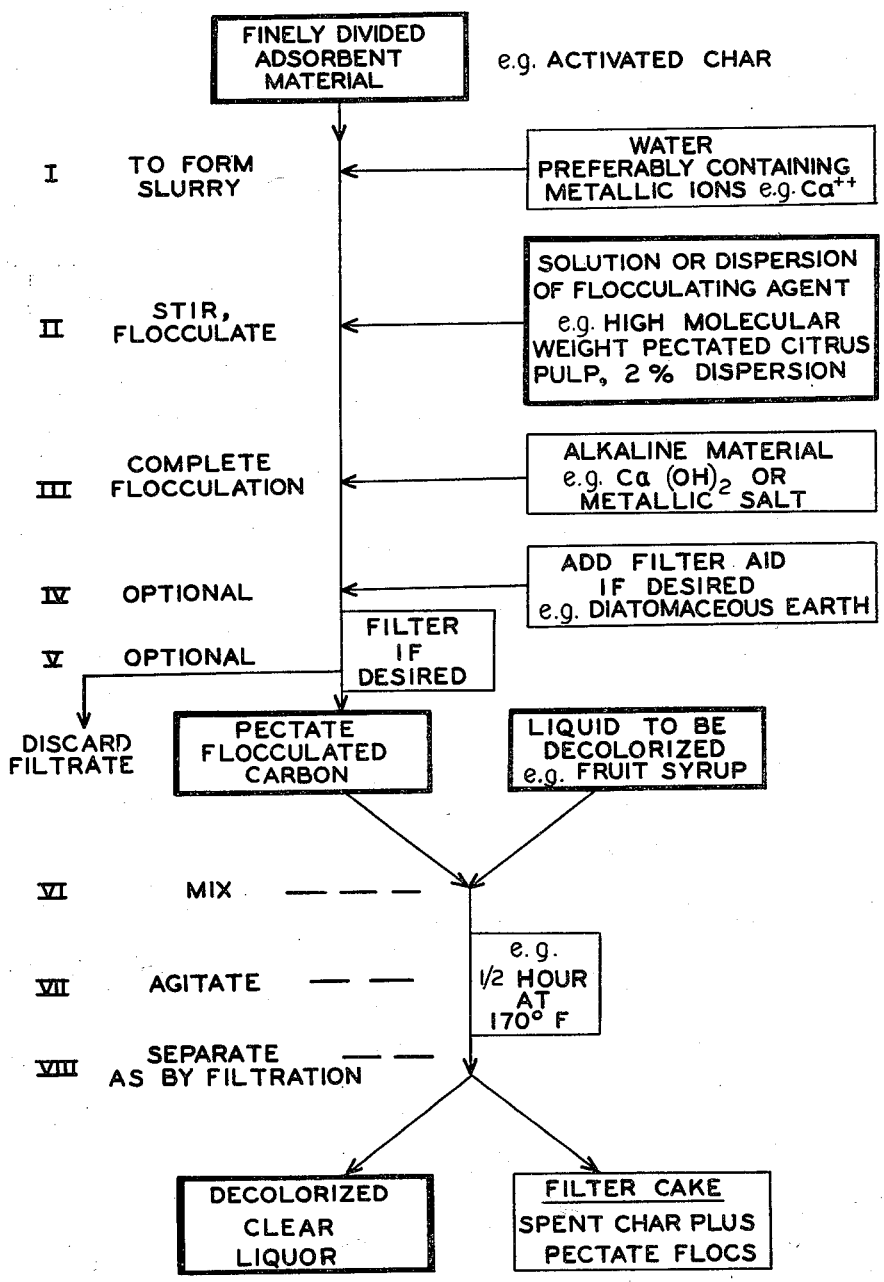

United States Patent Office 2,764,512
Patented Sept. 25, 1956

2,764,512

FLOCCULATED ADSORBENTS, PROCESS OF THEIR MANUFACTURE AND APPLICATION FOR DECOLORIZING AQUEOUS SOLUTIONS

Clarence Walter Wilson, Ontario, Calif., assignor to Sunkist Growers, Inc., Los Angeles, Calif., a corporation of California Application September 29, 1952, Serial No. 312,168

17 Claims. (Cl. 127—49)

This invention relates to a product and a process for the purification of liquids containing suspensoid and sol type impurities and is more particularly concerned with the selective adsorbtion of such impurities by hydrophilic, gelatinous colloid enveloped activated carbon particles, which are introduced into the impure liquid and then removed therefrom after performance of their adsorptive function.

The use of surface active materials in finely divided form, particularly activated carbon, for decolorizing and deodorizing aqueous liquids is well-known. In some aqueous solutions, for example, sugar solutions such as fruit juices, the finely divided carbon will often become peptized and consequently is impossible to remove by ordinary filtration after it has been used for decolorization. This tendency is particularly troublesome in the case of materials such as fruit juices or syrups intended for human consumption, since the suspended carbon which passes through the filter may impart to the filtrate a medicinal taste and a bluish or greenish color, both of which are undesirable. In some cases this medicinal off taste can be detected even though no colloidal carbon can be observed visually.

It is, of course, possible that this colloidal material could be removed by filtration through a very fine filter. However, when this procedure is employed the rate of filtration becomes so slow as to be impractical. It is also well-known that such colloidally dispersed materials may often be agglomerated into larger masses, which are more readily filterable, by the use of various gelatinous flocculating materials. The present invention relates to a novel method of employing such flocculating materials. Briefly, this method comprises coating or enveloping the adsorbent particles with a readily hydratable, or hydrophilic, gelatinous colloid in such manner as to agglomerate the adsorbent particles into flocculent masses, thereafter using the agglomerated adsorbent masses for decolorizing the liquid, and finally separating the spent adsorbent masses from the liquid by filtration or other means.

It is an object of the invention to prevent adsorbent materials from becoming colloidally dispersed in aqueous solutions, particularly fruit juices and syrups having a certain amount of acidity, and thereby to facilitate the subsequent removal of such adsorbents therefrom.

Another object of the invention is to provide means for rapidly and completely separating adsorbent materials from aqueous solutions after the adsorbent materials have been utilized for decolorizing or deodorizing the solution.

Another object of the invention is to provide an economical method for removing, or preventing the formation of, the undesirable colors and/or tastes that may be imparted to aqueous sugar-containing solutions by decolorizing charcoal.

A specific object of the invention is to provide a specific series of steps utilizing a colloid, such as, for example, a pectic material, for flocculating adsorbent materials suspended in aqueous solutions, and using said adsorbent material for decolorizing and/or deodorizing, which procedural sequence will efficiently utilize the clarifying and flocculating properties of the colloidal pectic material, and at the same time will not impair the decolorizing power of the adsorbent material.

I achieve the foregoing objects and others which will appear from the following description, by means of the process set forth in the accompanying flow sheet and more particularly described hereinafter.

Broadly stated, my process consists in first treating an aqueous suspension of finely divided decolorizing carbon or other adsorbent material with a hydrophilic colloidal flocculating material, in such manner as to surround the carbon particles with gelatinous flocs of coagulated material. This mixture of flocculated decolorizing charcoal is then added to the liquid to be decolorized, the resulting mixture is then agitated for a period of time sufficient to effect decolorization and/or deodorization, after which the insoluble material is separated, either by filtration or settling or centrifuging, or other known methods. Surprising as it may seem, I have found that this coating of the carbon with a hydrophilic gelatinous colloid does not adversely affect its decolorizing power.

The colloid which I prefer to use in my process is a pectic material capable of forming gels from aqueous solutions thereof. However, other hydrophilic gelatinous colloids which are capable of flocculating finely dispersed solid particles, such as agar and sodium alginate, for example, have been found to be effective in my novel process. The particular mechanism of gel formation does not appear to be critical. For example, an aqueous sol of sodium pectate forms a gel in the presence of certain metal ions, such as calcium. Agar, on the other hand, does not require the presence of metallic ions for gel formation, an agar gel being formed by merely cooling a warm aqueous agar sol. It appears that any of those floc forming materials which are ordinarily used to clarify aqueous solutions containing finely divided adsorbent particles may be used in my process. Effectiveness of the gel forming materials may vary somewhat depending upon the particular gel used. However, when the adsorbent particles which are to be used to decolorize the aqueous solution are previously treated with a flocculating agent in accordance with my invention, they all exhibit a faster filtration rate than in the case where the preliminary treatment is omitted. An essential requirement is that the gelatinous colloid must be present in amounts sufficient to completely envelop the adsorbent particles.

In Example I the pectic material employed, known as "pectate pulp," consists of a crude citrus pulp material which has been treated at low temperatures with an alkali such as, for example, soda ash, in accordance with the process set forth in my previous Patent No. Re. 21,067. The product of this patent consists of a mixture of high-molecular weight pectic acid salts of alkali metals or ammonia, (about 1/3 by weight), together with the natural proportions (about 2/3 by weight) of cellulose and other inert materials occurring in the albedo of the citrus peel. The cellulosic materials are relatively inert in my process.

EXAMPLE I 25.5 pounds of finely divided activated carbon (Darco KB) is stirred into 12 gallons of water and mixed to form a slurry. To this slurry is added 3 gallons of a 2% aqueous dispersion of a crude pectate pulp. This amount was calculated to furnish a ratio of dry pectate pulp to char of about 1 to 50, or of pure pectates to char of about 1 to 150. Stirring is continued as 6.6 pounds of dry calcium hydroxide is added to the mixture. This amount of lime was calculated to partially neutralize the acid in the syrup hereinafter added and to yield a final filtrate having a pH of about 3.9. About 1 to 10 pounds of diatomaceous earth filter aid is next added to the pectate-carbon-lime slurry. To the resulting aqueous mixture is then added 100 gallons of a concentrated pineapple syrup prepared from pineapple waste, and having a medium amber color. This final slurry of pectate flocculated carbon, lime and filter aid in the pineapple syrup is then agitated slowly for about one half hour at a temperature of around 170° F. to effect decolorization. The mixture is then pumped to a filter and filtered to yield a filter cake consisting of carbon-pectate flocs, filter aid and suspended matter from the syrup, and a light straw colored filtrate having a pH of about 3.9. This filtrate constitutes the clarified pineapple syrup.

A quantitative, comparative tabulation is given in the following table showing the comparative results obtainable by procedures similar to that outlined in the above example as compared to a control procedure employing no flocculating agent. The relative color of the products is measured by means of a Klett-Summerson colorimeter having a scale reading from zero to one thousand, and equipped with a blue filter, No. 42. In this device, the intensity of color is objectively measured by means of photoelectric cells. The initial syrup had a Klett-Summerson reading of about 900 and thus was off the scale of the measuring instrument. However, the material showed a reading of 580 when diluted with an equal volume of water. By extrapolation this would indicate an initial color reading of 1,160 on the Klett-Summerson scale. The filtration rates were measured by maintaining a constant height of liquid above a small filter of constant area and measuring the number of mils of filtrate per ten minutes. Whatman No. 4 filter paper was used as the filter in each of Examples I to III.

Table I

| Procedure | Run No. | Percent Pectate Pulp to Carbon | Filtration Rate, Ml/ 10 Min. | Color of filtrate Klett-Summerson No. 42 Filter |
| --- | --- | --- | --- | --- |
| Control-carbon added directly to syrup. | 92 | 0 | 8.5 | Black}unmeasurable. |
| | 95 | 0 | 7.0 | Black}urable. |
| As in Example I. | 32 | 2 | 52 | 271. |
| | 94 | 2 | 31 | 270. |
| | 96 | 2 | 22 | 238. |
| | 35 | 2 | 42.5 | 212. |

The example given above represents a commercially feasible application of the present invention as applied to the decolorization of pineapple syrup. However, the procedures employed in the various runs reported in Table I, were not calculated to duplicate commercial conditions, but merely to obtain comparative results. For example, a less retentive filter was used than would ordinarily be used in commercial practice, and the samples were severely agitated for 1 minute with a rotary mixer immediately prior to filtration in order to disperse the carbon as completely as possible, and to severely test the toughness of the flocs in runs 32, 94, 96 and 35.

The nomenclature for the pectic substances used throughout the specification and claims herein is intended to be in concord with the recommendations of the Committee for Revision of the Nomenclature of Pectic Substances, the report of which was published in Chemical Engineering News, volume 22, page 105, for January 25, 1944. Therefore, the terms "pectic acid" or "pectates" as used herein are applied to the substances composed mostly of colloidal polygalacturonic acids or their salts, which contain only a negligible proportion of methyl ester groups.

Many variations to the procedures set forth in the above example are contemplated, some of which will be hereinafter discussed in more particular reference to the accompanying flow sheet.

While any of the various activated carbons or chars constitute the principal adsorbent starting materials to which this process is applicable, other adsorbent materials which are apt to become colloidally dispersed in aqueous liquors may also be advantageously treated and removed by my improved process.

In step I of my process the finely divided adsorbent material to be used is preferably mixed with sufficient water to form a slurry. The water used may be ordinary tap water or other aqueous fluid compatible with the liquids to be decolorized. It is preferable that the water used, or the adsorbent material should contain sufficient metallic ions, particularly divalent ions such as calcium, to at least partially coagulate the dispersed, or sol form, of the pectate added in step II. Nearly any metallic ion will cause flocculation to occur in such a pectate dispersion if the ion is present in sufficient quantities. However, the polyvalent ions have a much greater effect, less than stoichiometric amounts sometimes being sufficient. Pectate pulp dispersions are very sensitive to calcium and aluminum ions, for example, and relatively insensitive to monovalent ions such as sodium. However, such monovalent ions will cause flocculation if present in sufficiently large quantities.

The pectic materials which are employed in step II of my process may consist of any pectic or pectinic acid salts capable of forming a solution, or sol, in water and of undergoing gelation and syneresis, with the resultant formation of flocculent masses, when treated with any of various metallic ions, particularly polyvalent ions. As mentioned above, the preferred material is described in my previous Patent No. Re. 21,077, and that patent also discloses the method, applicable herein, for dispersing the pectated pulp in water. This method consists broadly in heating and agitating the pectated pulp with the desired amount of water in the presence of alkaline materials, such as, for example, an alkaline phosphate such as trisodium phosphate. The pectates contained in dissolved, or sol form in such a dispersion are of relatively high-molecular weight in comparison with pectates prepared by other known methods. They are characterized by a high sol viscosity, and by the formation of a precipitate of fibrous appearance when an aqueous sol thereof is precipitated with alcohol; low molecular weight pectates yield a more amorphous alcohol precipitate. Such high-molecular weight pectates appear to be particularly advantageous in flocculating insoluble solids from aqueous solutions.

The amount of pure pectic material used, relative to the weight of carbon to be treated, may vary over a wide range, depending upon the type of pectic material used, as well as other variables in the nature of the decolorizing material and the liquor to be clarified. When using a high molecular weight pectate as in the above example, as little as 0.66% by weight is quite effective, and under some circumstances, considerably less may be employed with good results. Low molecular weight pectates and pectinates are apparently not as effective, and consequently larger amounts thereof would be required.

The dispersion of pectate pulp prepared as outlined above is then stirred into the carbon slurry to form a flocculated pectate-carbon slurry, step II. It is preferable that the pectate material should be stirred into the slurry in such manner that the pectate will become coextensive with all parts of the slurry before appreciable syneresis of the initial pectate gel takes place. For this reason it is preferable that the carbon slurry should not contain so much metallic salt as to completely precipitate the pectate gel before the pectate sol can become coextensive with the body of liquid, and thus completely surround the carbon particles.

While I do not wish to be limited to any theory as to the mechanism of operation of my process, the best information now available appears to indicate that dispersed or sol forms of such pectate materials as used herein are first precipitated in the form of a dispersed gel upon admixture with metallic ions such as calcium. The gels of such materials as pectic acid salts and very low-methoxyl pectinates then undergo syneresis, or shrinkage, retaining any enmeshed carbon or other suspended particles during the process, and finally forming a flocculent precipitate. The final form of this precipitate is somewhat variable, depending upon the amount and type of precipitating metallic ions. The flocs of precipitated pectate are said to be more or less "tough" depending upon whether they will withstand severe agitation, or will be redispersed thereby. In general, very low concentrations of metallic ions yield soft and fragile flocs; whereas larger quantities yield tougher flocs. In my process it is preferable to form fairly tough flocs in those processes wherein the liquors are subsequently to be rather severely agitated, as in passing through centrifugal pumps.

In order to toughen the flocs, it may be preferable as indicated in step III to add more metallic ions to the flocculated pectate-carbon slurry, such as, for example, calcium hydroxide. In the particular example given the calcium hydroxide also serves the purpose, purely extraneous to the present invention, of partly neutralizing the acid in the juice liquor to be subsequently decolorized. However, in using my preferred flocculating agent, pectate pulp, no critical operating pH is necessary, either in the carbon flocculating steps (II and III), or the decolorizing step (VII). These steps may be performed within a wide pH range, extending well into the acid or alkaline ranges. Therefore in cases wherein the particular liquid being decolorized requires in itself no pH adjustment, the alkaline material may be omitted, or nonalkaline metallic salts added. In cases wherein the original slurry of carbon and water contained sufficient metallic ions to furnish pectate flocs of the desired firmness, step III may be omitted entirely.

Step IV consists in the addition of a filter aid to the material, for example diatomaceous earth. This material hastens the filtration of the liquor, but may be omitted if such acceleration of the filtration rate is not required. It is not essential that the filter aid be added at this particular point in the process; it may be added at any point following formation of the pectate floc (step II), but prior to final filtration (step VIII).

In step V the slurry of flocculated carbon may be filtered if desired, and the filtrate discarded. The remaining filter cake, consisting essentially of a solid mass of finely divided carbon enveloped in a gelatinous pectate matrix, may then be added to the liquid to be decolorized in step VI. This procedure may be desirable in cases where it is desired not to dilute the liquid to be decolorized, or to transport the filter cake from one locality to another between preparation and use thereof. If desired the filter cake may be dried for storage or transport.

The flocculated pectate-carbon, either as a slurry or as a filter cake, is then added in any suitable manner to the liquid to be decolorized (step VI). The liquor to be decolorized may consist of any aqueous liquid or solution which may desirably be decolorized by the use of an adsorbent material such as activated char, and also in which it is desired to provide a rapid filtration of the decolorized liquor, and/or to insure that all traces of the activated char are removed from the final product. Such liquids include predominantly extracts of vegetable origin containing sugar, which may or may not be concentrated, as well as other products intended for human consumption in the form of clear liquids.

Upon mixing the liquid to be treated with the flocculated carbon, the procedure for effecting decolorization is substantially the same as has been heretofore practiced in the use of activated carbon alone. The mixture should be agitated in order that the activated carbon particles may come into contact with all parts of the liquid. Somewhat elevated temperatures appear to accelerate adsorption of colors and odors. It is preferable, however, that the agitation not be so severe as to break the pectate flocs down to too small a size, since this would tend to peptize some of the activated carbon. I have found, however, that if the pectate flocs are sufficiently hardened, as in step III, the material will withstand quite severe agitation as for example, that encountered in centrifugal pumps, and in turbulent flow through pipes, without deleterious effects.

After the material has been decolorized to the desired extent, the insoluble solid materials may then be removed from the liquid by means of filtration, settling, centrifuging, or any other known method for separating insoluble materials from liquids. As shown in the foregoing table the rate of filtration obtained by the use of pectate flocculated carbon is about six times as great as that obtainable through identical filters, but omitting the pectate flocculation step. I have found also that the filtrates obtained by my process have no detectable off taste or visible color attributable to the activated carbon used.

Moreover, contrary to what might be expected, I have found that the flocculation and coating of the carbon particles with the gelatinous pectate does not detectably decrease its adsorbent power. It is this surprising property which makes possible the particularly advantageous sequence of procedures which I have described. Relying merely upon what has been previously known, it might be supposed that it would be necessary to add the activated carbon directly to the liquid to be decolorized and effect decolorization of the liquid prior to flocculation of the carbon. However, I have found that this procedure is actually disadvantageous to that described herein. In my procedure it is possible to flocculate the carbon in a relatively small volume of liquid, and it is therefore possible to readily distribute the pectate dispersion evenly throughout the suspending liquid before complete precipitation occurs. Also, in such a small volume, the concentration of pectate is much greater and therefore the carbon particles are more securely entrapped within the gelatinous flocs. That is, the carbon to be flocculated by the shrinking of each pectate floc is concentrated in a much smaller volume in my process than would be the case if the carbon and pectate were added successively to the much larger volume of liquid to be decolorized. The result is a more efficient flocculation of the carbon with a smaller amount of pectate. Also, over and above the improved results obtained by my process, it is a great convenience in commercial installations to flocculate the carbon in small volumes, where the rate of stirring and mixing can be readily controlled.

The intermediate product of steps II, III, IV, or V of my process, consisting essentially of the pectate flocculated carbon, together perhaps with some fortuitous materials such as cellulose particles from the pectated citrus pulp, or adventitious materials such as a filter aid, may be prepared independently and commercialized as such. Such a product could be conveniently sold and transported either as a slurry, a wet filter cake, or a dry filter cake. On a dry basis, such a product would preferably contain activated carbon and pectate pulp in a ratio of about 50 parts of carbon to about one part of pectate pulp. However, these proportions may be varied considerably to suit specific needs. The convenience and versatility in use of such a product for various commercial requirements in the decolorizing and deodorizing of aqueous liquids, represent distinct advantages over prior art methods.

EXAMPLE II

The procedure described in Example I was again carried out except that sodium alginate was substituted for pectate pulp as the flocculating agent. Also in this example, as well as Example III, the pineapple syrup to be clarified was several years older and hence somewhat darker in color than the pineapple syrup used in Example I. In this example 1.4 parts by weight of sodium alginate was used with 100 parts by weight of activated carbon (Nuchar GEE). The filtration rate observed was 11.5 cc. in ten minutes and the color of the filtrate was yellow-green. In comparison, when the process is carried out in the absence of the alginate, i. e. when the carbon is added directly to the syrup, in the absence of any hydrophilic colloid, the filtration rate is found to be 9 cc. in ten minutes and the color of the filtrate was dark green.

EXAMPLE III

An agar sol was prepared by heating an aqueous dispersion of agar. The agar sol was then mixed with activated carbon, sufficient of the sol being used to produce a composition containing six parts by weight of solid agar per 100 parts by weight of activated carbon. The mixture was gelled by chilling and stirring. The gel was then added to the pineapple syrup to be clarified, as in Example I. The mixture was agitated and filtered in accordance with the procedure of Example I, with the exception that the mixture was not heated during the agitation and/or filtration steps.

The filtration rate was found to be 7 cc. in ten minutes. The color of the filtrate was yellow and measured 680 on a Klett-Summerson colorimeter having a No. 42 filter. In comparison, a control mixture wherein the agar is omitted and no other hydrophilic colloid is present, produced a black filtrate at a filtration rate of 5 cc. in ten minutes.

This application is a continuation-in-part of my co-pending application Serial No. 167,390, filed June 10, 1950, and now abandoned.

Having thus described my invention in such full, clear, concise, and exact language as to enable others skilled in the art to use the same, I claim as my invention and desire to secure by Letters Patent the following:

1. A process for purifying an aqueous sugar containing liquor of vegetable origin which comprises forming a mass consisting essentially of activated carbon particles enveloped by a hydrophilic, insoluble pectic colloid, the amount of said colloid being at least sufficient to completely surround said particles with said colloid, mixing and maintaining said mass in intimate contact with said liquor for a time sufficient to effect substantial decolorization thereof, and separating said liquor from said mass.

2. A process for decolorizing and deodorizing an aqueous solution which comprises first forming an aqueous slurry of decolorizing carbon particles, said particles being completely surrounded by gelatinous flocs of an insoluble metal salt of a high-molecular weight pectic acid, the amount of said pectic acid salt being in minor amount to said particles but at least sufficient to completely surround said particles with said pectic acid salt, mixing and maintaining said slurry in intimate contact with said aqueous solution for a time sufficient to effect substantial decolorization thereof, and separating said carbon particles and associated pectic flocs from said solution.

3. A process for decolorizing and deodorizing aqueous solutions which comprises forming an aqueous suspension of decolorizing carbon particles, adding to said suspension an aqueous dispersion of a water soluble, high-molecular weight pectate, the amount of said pectate being at least sufficient to completely surround said particles with said pectate, precipitating said pectate material as a flocculent, insoluble salt by providing a metal salt in the slurry of carbon and pectate whereby said pectate envelopes said carbon particles, mixing the resulting flocculated pectate-carbon slurry with said aqueous solution, agitating the resulting mixture for a time sufficient to effect substantial decolorization thereof, and thereafter separating the insoluble solids from said mixture.

4. A process for purifying an aqueous sugar containing liquor which comprises forming an aqueous suspension of decolorizing carbon particles, the aqueous phase of said suspension containing sufficient metallic ions to flocculate a substantial amount of a soluble pectate salt, adding to said suspension an aqueous dispersion of a water soluble, high-molecular weight pectate, the amount of said pectate being at least sufficient to completely surround said particles with said pectate whereby said pectate envelopes said carbon particles, mixing the resulting pectate carbon slurry with said liquor, agitating the resulting mixture for a time sufficient to effect substantial decolorization thereof, and thereafter separating the carbon and flocculent solids from said liquor.

5. A process for purifying an aqueous, acidic, sugar containing liquor which comprises forming an aqueous suspension of decolorizing carbon particles, adding to said suspension an aqueous dispersion of a water soluble, high-molecular weight pectate, the amount of said pectate being in minor amount to said particles but at least sufficient to completely surround said particles with said pectate, adding to the carbon-pectate slurry an alkaline material to partially neutralize the acidic materials in said sugar containing liquor and to flocculate said pectate material whereby said carbon particles are completely surrounded by said pectate material, mixing the resulting flocculated pectate-carbon slurry with said liquor, agitating the resulting slurry-liquor mixture for a time sufficient to effect substantial decolorization thereof, and thereafter separating the carbon and flocculent solids from said liquor.

6. A process for decolorizing and deodorizing an aqueous solution comprising first forming a solid mass of decolorizing carbon particles enveloped in a matrix of water insoluble, hydrophilic pectic material of high-molecular weight, the amount of said pectic material being in minor amount to said particles but at least sufficient to completely surround said particles with said pectic material, adding said mass to said liquor, and dispersing it therein, maintaining said dispersed mass in intimate contact with said liquor for a time sufficient to effect substantial decolorization thereof, and separating said liquor from said pectic-carbon mass.

7. A composition of matter comprising a solid mass of finely divided activated carbon particles embedded in a matrix consisting essentially of a synerized, high-molecular weight pectate gel, the proportions by dry weight of said carbon to said pectate being about 150 to 1.

8. A process for preparing a pectate flocculated activated carbon suitable for decolorizing and deodorizing aqueous liquids which comprises intimately mixing in an aqueous medium finely divided activated carbon and a high-molecular weight pectate sol, the amount of said pectate being in minor amount to said carbon but at least sufficient to completely surround said carbon with said pectate whereby said pectate envelopes said carbon, and flocculating said pectate sol by providing metallic ions in said aqueous medium.

9. A process for decolorizing and deodorizing an aqueous solution which comprises treating said solution with a mass of finely divided activated carbon particles, said carbon particles being enveloped by a synerized, high-molecular weight pectate gel, the amount of said gel being in minor amount to said carbon but at least sufficient to completely surround said particles with said gel, and thereafter separating said carbon particles and said gel from said solution.

10. A process for decolorizing and deodorizing aqueous solutions which comprises forming a flocculated mass comprising carbon particles enveloped by calcium pectate gel, mixing and maintaining said mass in intimate contact with said aqueous solution for a time sufficient to effect substantial decolorization thereof and separating said aqueous solution from said mass.

11. A process for decolorizing and deodorizing aqueous solutions which comprises forming a flocculated mass comprising carbon particles enveloped by calcium pectinate gel, mixing and maintaining said mass in intimate contact with said aqueous solution for a time sufficient to effect substantial decolorization thereof and separating said aqueous solution from said mass.

12. A process for decolorizing and deodorizing aqueous solutions which comprises forming a flocculated mass comprising carbon particles enveloped by a hydrophilic, gelatinous colloid selected from the group consisting of agar and a water insoluble salt of an acid selected from the group consisting of pectic acid, pectinic acid and alginic acid, mixing and maintaining said mass in intimate contact with said aqueous solution for a time sufficient to effect substantial decolorization thereof, and separating said aqueous solution from said mass.

13. The process of claim 11 wherein the colloid is calcium alginate.

14. A composition of matter capable of decolorizing and deodorizing aqueous solutions, comprising activated carbon particles enveloped by a hydrophilic, gelatinous colloid selected from the group consisting of agar and a water insoluble salt of an acid selected from the group consisting of pectic acid, pectinic acid and alginic acid, the amount of said colloid being at least sufficient to completely surround said particles with gel.

15. The composition of claim 14 wherein the colloid is calcium pectate.

16. The composition of claim 14 wherein the colloid is calcium pectinate.

17. The composition of claim 14 wherein the colloid is calcium alginate.

References Cited in the file of this patent

UNITED STATES PATENTS

| | | |
|---|---|---|
| 1,868,565 | Connolly | July 26, 1932 |
| 2,015,375 | Bomonti | Sept. 24, 1935 |
| 2,059,110 | Ioannu | Oct. 27, 1936 |
| 2,166,868 | Jones | July 18, 1939 |
| 2,216,754 | Sanchez | Oct. 8, 1940 |
| 2,312,446 | Schoenbeck | Mar. 2, 1943 |
| 2,419,930 | Wilson | Apr. 29, 1947 |
| 2,605,229 | Marcus | July 29, 1952 |
| 2,639,268 | Heiss | May 19, 1953 |
| 2,679,464 | Moore | May 25, 1954 |